United States Patent

Hayakawa (10) Patent No.: US 10,341,508 B2
(45) Date of Patent: Jul. 2, 2019

(54) INFORMATION PROCESSING APPARATUS, INFORMATION PROCESSING METHOD, AND NON-TRANSITORY COMPUTER READABLE STORAGE MEDIUM

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/366,235

(22) Filed: Dec. 1, 2016

(65) Prior Publication Data

US 2017/0187893 A1 Jun. 29, 2017

(30) Foreign Application Priority Data

Dec. 25, 2015 (JP) ................................. 2015-255234

(51) Int. Cl.
  *H04N 1/00* (2006.01)
  *G06F 3/12* (2006.01)

(52) U.S. Cl.
  CPC ......... *H04N 1/00196* (2013.01); *G06F 3/125* (2013.01); *G06F 3/1208* (2013.01); *G06F 3/1286* (2013.01); *H04N 1/00167* (2013.01); *H04N 1/00251* (2013.01); *H04N 1/00411* (2013.01)

(58) Field of Classification Search
  CPC ........................... H04N 1/00196; G06F 3/1208
  See application file for complete search history.

(56) References Cited

U.S. PATENT DOCUMENTS

| 7,362,919 B2* | 4/2008 | Das ................... G06F 17/30274 382/284 |
| 2002/0073121 A1* | 6/2002 | Sano ....................... G06F 17/24 715/255 |
| 2005/0140800 A1* | 6/2005 | Jeon ....................... H04N 5/232 348/231.99 |

(Continued)

FOREIGN PATENT DOCUMENTS

| JP | 2001325601 A | 11/2001 |
| JP | 2006323621 A | 11/2006 |

(Continued)

OTHER PUBLICATIONS

Japanese Office Action issued in corresponding Japanese Application No. 2015255234 dated Jan. 21, 2019.

*Primary Examiner* — Ibrahim Siddo
(74) *Attorney, Agent, or Firm* — Venable LLP (57) ABSTRACT

An image file temporarily copied to a storage unit from an outside in order to create an album is deleted from the storage unit after the album is ordered. Therefore, the image file needs to be copied again from the outside in order to re-edit the album that has been created once, degrading user operability and requiring many apparatus resources. In order to solve this, according to an example of the present invention, in an information processing apparatus which lays out a plurality of images, images are obtained, the obtained images are stored in the storage unit, and the obtained images are selected and laid out. At this time, information on the selected images is left, and images other than these are deleted from the storage unit.

14 Claims, 8 Drawing Sheets

(56) References Cited

U.S. PATENT DOCUMENTS

| | | | |
|---|---|---|---|
| 2006/0050337 A1* | 3/2006 | Hitaka | G06F 17/24 |
| | | | 358/537 |
| 2006/0053370 A1* | 3/2006 | Hitaka | G11B 27/034 |
| | | | 715/251 |
| 2007/0013937 A1* | 1/2007 | Kim | G06F 3/1205 |
| | | | 358/1.13 |
| 2012/0151332 A1* | 6/2012 | Kaneko | G06F 3/1208 |
| | | | 715/253 |
| 2014/0203085 A1* | 7/2014 | Park | G06K 7/1417 |
| | | | 235/462.1 |
| 2015/0077777 A1 | 3/2015 | Hayakawa | H04N 1/00501 |
| 2017/0013148 A1 | 1/2017 | Hayakawa | H04N 1/00941 |

FOREIGN PATENT DOCUMENTS

| | | | |
|---|---|---|---|
| JP | 2010-072934 A | | 4/2010 |
| JP | 2010-072934 | * | 5/2010 |
| JP | 2011097574 A | | 5/2011 |

\* cited by examiner

LOAD SD MEMORY CARD.

PLEASE PRESS OK AFTER INSERTING SD MEMORY CARD INTO SD MEMORY CARD SLOT.

LOADING OF SD MEMORY CARD IS COMPLETED.

PLEASE PRESS OK AFTER REMOVING SD MEMORY CARD.

INFORMATION PROCESSING APPARATUS, INFORMATION PROCESSING METHOD, AND NON-TRANSITORY COMPUTER READABLE STORAGE MEDIUM

BACKGROUND OF THE INVENTION

Field of the Invention

The present invention relates to an information processing apparatus, an information processing method, and a non-transitory computer readable storage medium, and particularly to, for example, an information processing apparatus, an information processing method, and a non-transitory computer readable storage medium each automatically laying out a plurality of images captured by a digital camera or the like and creating a photo album.

Description of the Related Art

Conventionally, a technique of scoring an image file and utilizing a score value tied up with the image file to choose and lay out templates in order to create a photo album automatically is known (Japanese Patent Laid-Open No. 2010-72934).

When an album is created by loading an image file from an external storage medium such as a memory card, however, while there are cases in which the image file is copied to a storage unit temporarily for that creation, there are cases in which the image file is not saved in the storage unit because it becomes unnecessary after the album is ordered. For this reason, in order to re-edit the album that has been created once, it is necessary to copy the image file of the external storage medium to the storage unit again, and then create and order an album as the image file saved in the storage unit.

SUMMARY OF THE INVENTION

Accordingly, the present invention is conceived as a response to the above-described disadvantages of the conventional art.

For example, an image processing apparatus, an image processing method, and a non-transitory computer readable storage medium according to this invention are capable of deleting, for example, an image which is unlikely to be used when re-editing an image in which images are laid out.

According to one aspect of the present invention, there is provided an information processing apparatus which lays out a plurality of images, the apparatus comprising: an obtaining unit configured to obtain images; a storage unit configured to store the images obtained by the obtaining unit; and a processor configured to: select candidates for a layout target out of the images obtained by the obtaining unit; lay out at least some of the selected images; leave information on the selected images of the candidates for the layout target out of the images obtained by the obtaining unit; and delete, from the storage unit, information on at least some of the images that have not been selected as the candidates for the layout target.

The invention is particularly advantageous since out of obtained images, information on the images each selected as a candidate for a layout target is left, and at least some of the images each not selected as the candidate for the layout target are deleted from a storage unit. It is therefore possible to delete, for example, the image which is unlikely to be used when re-editing the image in which the images are laid out.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings. However, the scope of the present invention is not limited to the relative arrangements of the constituent elements and the like described in the embodiments unless otherwise specified.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

<Arrangement of Information Processing System (FIG. 1)>

Figure 1:
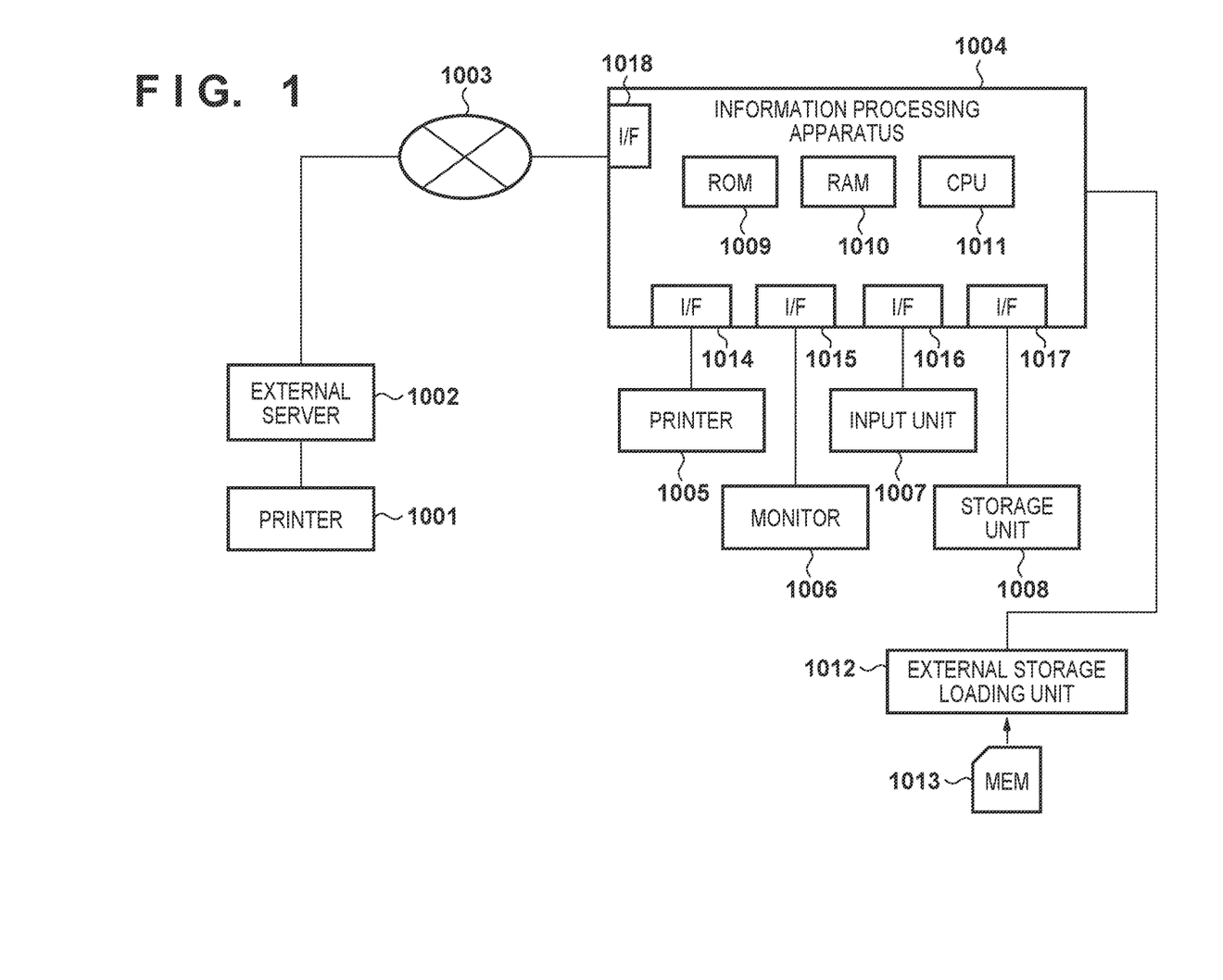
FIG. 1 is a block diagram showing the arrangement of an information processing system.

FIG. 1 is a block diagram showing the schematic arrangement of an information processing system (to be referred to as a system hereinafter) according to embodiments of the present invention. This system has the arrangement in which an information processing apparatus 1004 is connected to an external server 1002 via a network 1003, and the external server 1002 is further connected to a printer 1001.

The information processing apparatus 1004 can create an album (a photo album or a photo book) from input image data, and can output the created album as print data or upload it to the external server.

The information processing apparatus 1004 includes a CPU 1011, a ROM 1009, and a RAM 1010 and further includes a printer 1005, a monitor 1006, an input unit 1007, a storage unit 1008, and input/output interfaces (I/Fs) 1014 to 1018 configured to connect the printer 1005, the monitor 1006, the input unit 1007, the storage unit 1008 and the network 1003, respectively.

The CPU 1011 controls the information processing apparatus 1004 as a whole by executing an operating system (to be referred to as an OS hereinafter) stored in the storage unit 1008, the ROM 1009, or the RAM 1010. The CPU 1011 also implements the respective functions of the information processing apparatus 1004, or controls and executes constituent elements included in or connected to the information processing apparatus 1004 so as to compute and process information by executing programs stored in the ROM 1009 and the RAM 1010. The ROM 1009 stores the programs, a constant, and the like. The RAM 1010 is used as a work area of the CPU 1011. The RAM 1010 can also store the programs if it is made of a non-volatile memory such as an FeRAM.

The network 1003 is connected to the information processing apparatus 1004 and the external server 1002, and can transmit information to the respective connected units. The external server 1002 includes an input/output interface (not shown) configured to connect itself to the printer 1001.

The album created by the information processing apparatus 1004 is uploaded to the external server 1002 via the network 1003. If the uploaded album is printable, the external server 1002 outputs its data to the printer 1001. For example, the external server 1002 can operate as an album order/management server, and cause the printer 1001 to print out the album created by the information processing apparatus 1004 of a user once it is uploaded, and a procedure needed to purchase the album is performed. Then, an output print product undergoes binding and is delivered directly to the user.

On the other hand, the printer 1005 is an apparatus configured to print a print product created by the information processing apparatus 1004. Depending on a mode, the user may print the created album by using the printer 1005 owned by himself/herself, perform binding, and finish it as an album. The monitor 1006 is a display apparatus which displays image information output in the information processing apparatus 1004. The input unit 1007 is a unit such as a keyboard or a pointing device used in order to input a user instruction or the like to the information processing apparatus 1004. Note that a configuration obtained by integrating the monitor 1006 and the input unit 1007 with each other may be used. In this case, for example, there may be an apparatus having an arrangement in which a touch panel is provided on a display screen of the monitor 1006, and instruction input can be performed when the user directly touches the monitor. The storage unit 1008 is a unit such as an HDD (Hard Disk Drive) or an SSD (Solid State Drive) which saves the image data, templates, and the like.

The information processing apparatus 1004 can further be connected to an external storage loading unit 1012 and load the contents of an external storage medium 1013. In general, the external storage medium 1013 is an SD memory card, and the external storage loading unit 1012 is an SD memory card reader. However, another external storage medium such as a compact flash (CF) or a memory stick may be used. Therefore, image data captured and generated by an external digital camera or mobile terminal with a camera may be stored in the SD memory card, the memory stick, or the like and input via the external storage loading unit 1012.

In an example shown in FIG. 1, the information processing apparatus 1004, the monitor 1006, the input unit 1007, and the storage unit 1008 are shown separately from each other. Depending on the configuration of the information processing apparatus, however, they may have an integrated arrangement. That is, an arrangement like a tablet terminal may also be possible in which, for example, the information processing apparatus includes the monitor, the input unit, and the storage unit (may be shared as the RAM of the information processing apparatus). In this case, image data captured and generated by a camera unit of the tablet terminal, and stored in the storage unit 1008 may be used directly. Alternatively, the user may download and use image data uploaded to a cloud.

Some embodiments regarding album creation performed in a system having the above-described arrangement will now be described.

First Embodiment

Figure 2:
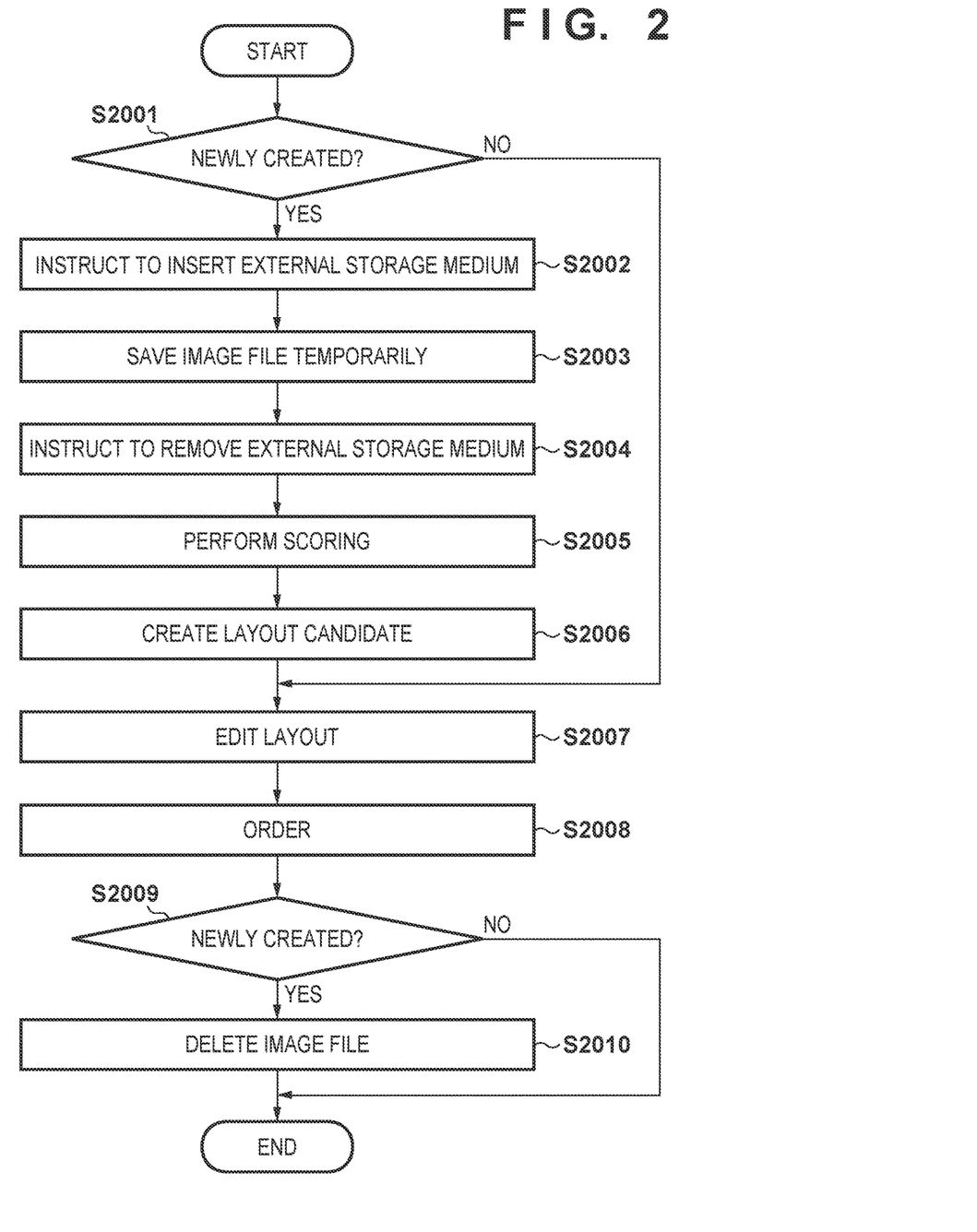
FIG. 2 is a flowchart showing album creation processing according to the first embodiment.

FIG. 2 is a flowchart showing album creation processing performed by a CPU 1011 of an information processing apparatus 1004.

First, in step S2001, it is checked whether a user newly creates an album. Therefore, the information processing apparatus 1004 displays, on a monitor 1006, a screen for confirming a user intention.

Figure 3:
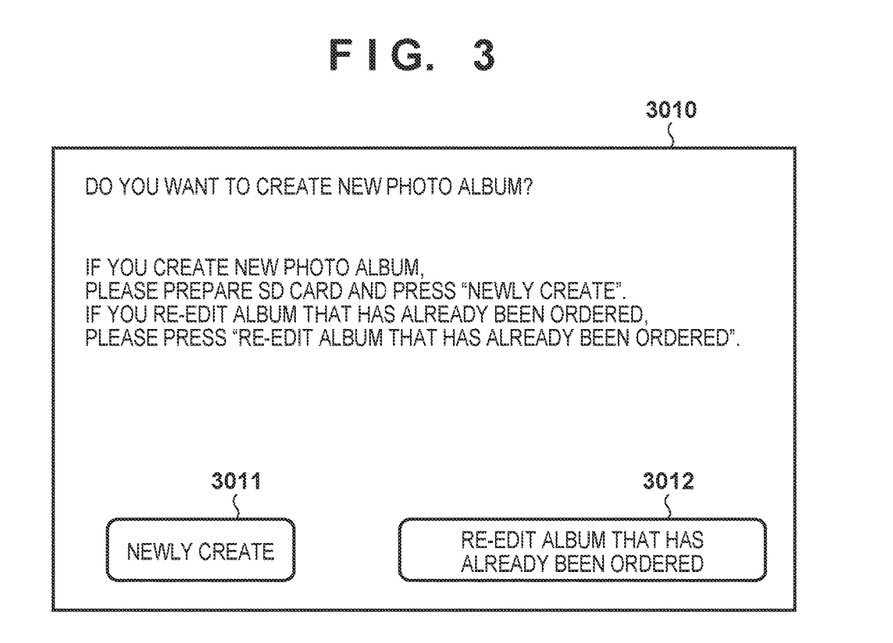
FIG. 3 is a view showing a screen of a user interface used for check with a user in the album creation processing or image edit processing.

FIG. 3 is a view showing a screen of a user interface (UI) used for a user confirmation. As shown in FIG. 3, a message for confirming whether the user newly creates the album or re-edits the album that has been ordered last time is displayed on a screen 3010. On the screen 3010, the user clicks a button 3011 when newly creating the album or clicks a button 3012 when re-editing the album that has already been ordered. When the album is newly created, that is, when the button 3011 is clicked, the process advances to step S2002. When the album that has been ordered last time is re-edited, that is, when the button 3012 is clicked, the process advances to step S2007.

Note that the user interface (UI) shown in FIG. 3 is merely an example used to describe an example briefly. Therefore, in order to improve user operability, the process may advance to step S2002 without displaying the screen as in FIG. 3 if there is no ordered album, or in consideration of a case in which there are a plurality of albums that have been reordered, a screen which causes the user to choose the album that has received the reorder may be displayed.

In step S2002, the information processing apparatus 1004 displays, on the monitor 1006, a screen for prompting insertion of an external storage unit (for example, a memory card).

Figure 4:
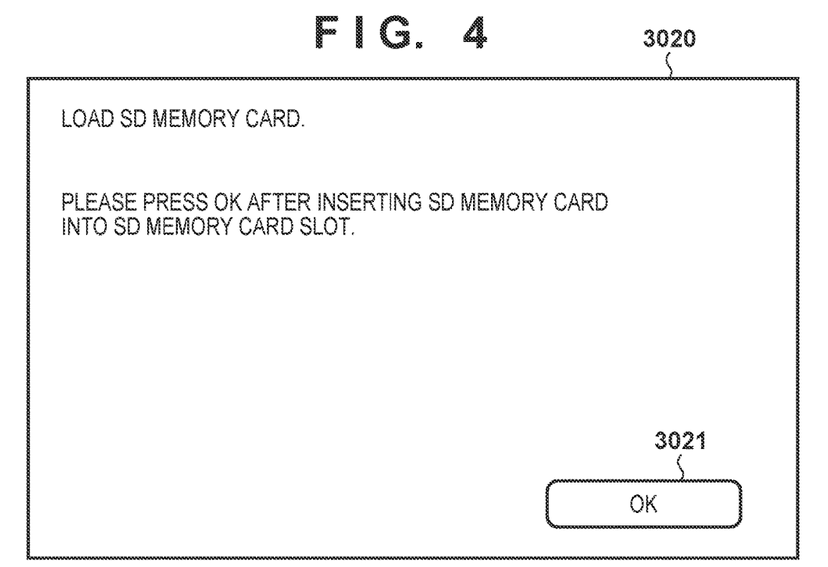
FIG. 4 is a view showing a screen of a user interface (UI) which prompts insertion of a memory card in the album creation processing or the image edit processing.

FIG. 4 is a view showing a screen of a user interface (UI) used to prompt insertion of an SD memory card. As shown in FIG. 4, a message which prompts insertion of the SD memory card is displayed on a screen 3020. The user inserts the SD memory card into an external storage loading unit 1012 according to an instruction on the screen. Then, the user clicks a button 3021 for confirmation.

In step S2003, the information processing apparatus 1004 copies an image file from the inserted SD memory card to a storage unit 1008 via the external storage loading unit 1012. Once the copy is completed, in step S2004, the information processing apparatus 1004 displays, on the monitor 1006, a screen for prompting removal of the external storage unit (for example, the memory card).

Figure 5:
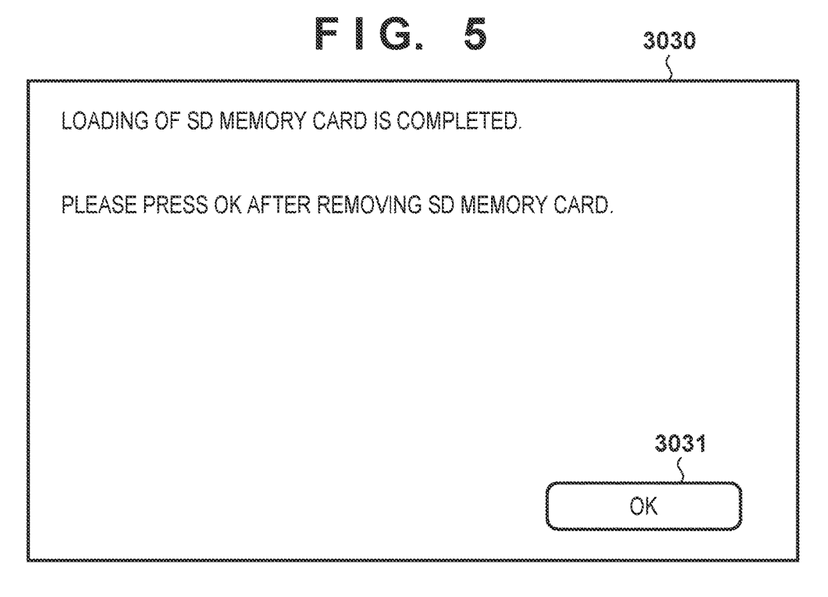
FIG. 5 is a view showing a screen of a user interface which prompts removal of the memory card in the album creation processing or the image edit processing.
Figure 6A:
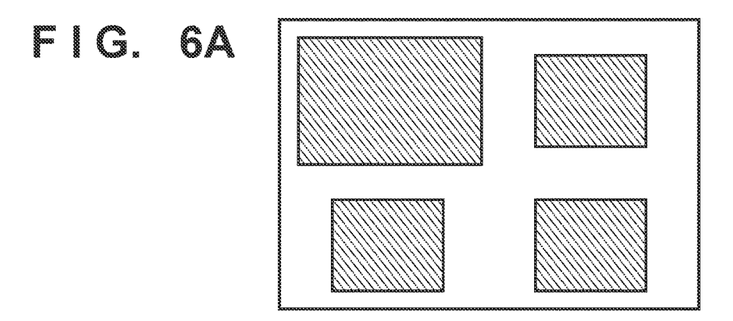
FIGS. 6A, 6B, 6C and 6D are views showing various layouts used in the album creation processing or the image edit processing.
Figure 6B:
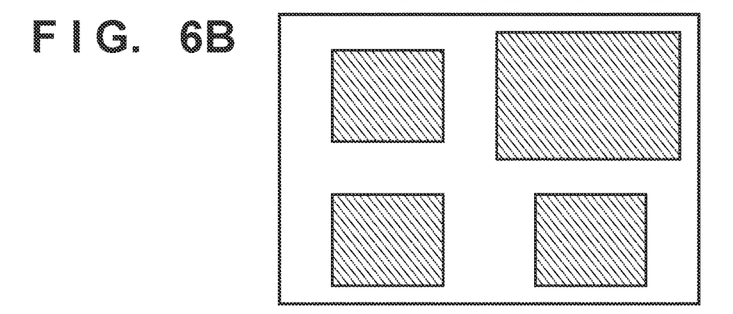
Figure 6C:
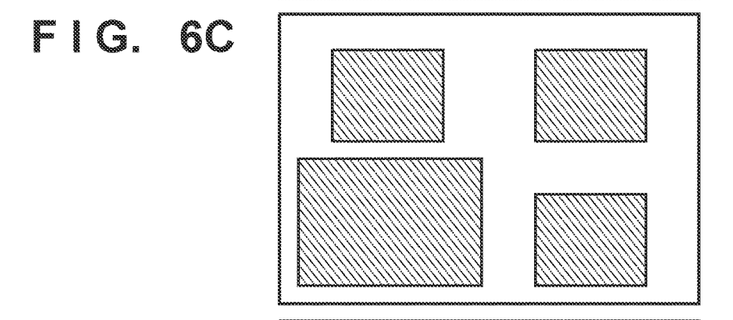
Figure 6D:
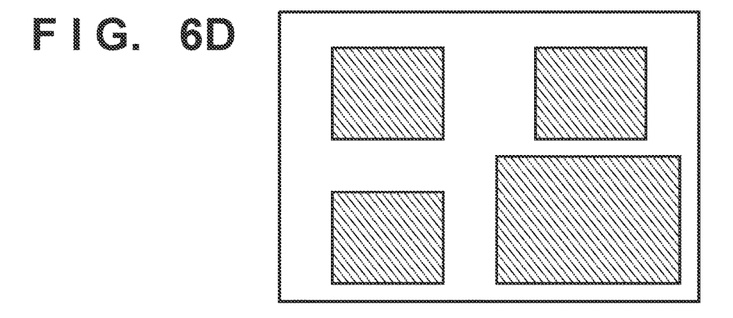

FIG. 5 is a view showing a screen of a user interface (UI) used to prompt removal of the SD memory card. As shown in FIG. 5, a message which indicates the completion of loading an image from an external storage medium (SD memory card) is displayed on a screen 3030. The user removes the SD memory card from the external storage loading unit 1012 according to a displayed instruction. Then, the user clicks a button 3031 for confirmation.

If the button 3031 is clicked, the information processing apparatus 1004 performs scoring of the copied image files in step S2005. Note that a description of a scoring process will be omitted. Further, in step S2006, the information processing apparatus 1004 repeats a process of laying out the image files that have undergone scoring, creating a layout list made of a plurality of layouts. Note that a description of a layout process will be omitted.

FIGS. 6A to 6D are views each showing an example of a template used in the layout process.

If the layout process is performed, the various templates as shown in FIGS. 6A to 6D are displayed on the monitor 1006. The user can perform the layout process by choosing his/her desired template from the displayed templates.

Figure 7:
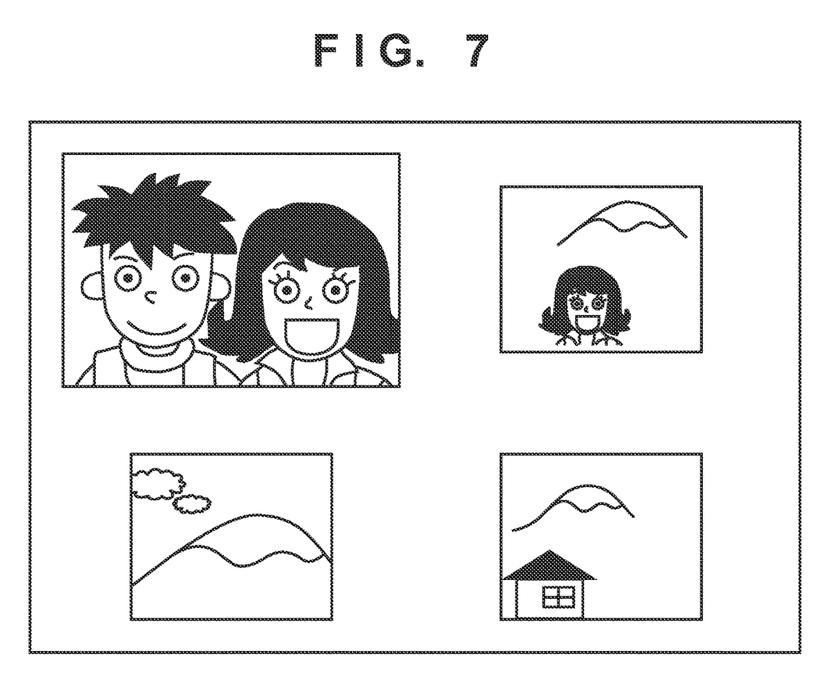
FIG. 7 is a view showing an image layout obtained as a result of the image edit processing.

FIG. 7 is a view showing an example of a result obtained by the layout process. FIG. 7 shows the result obtained by choosing FIG. 6A as the template and performing the layout process.

In step S2007, the user performs an editing operation of laid out albums. The user has created the layout list made of the plurality of layouts in step S2006, and thus changes the layouts to choose the layout which matches his/her preference. Then, in step S2008, the user orders the laid out albums.

In step S2009, the information processing apparatus 1004 rechecks whether the ordered album is a newly created album. If the user chooses to newly create the album in step S2001, the process advances to step S2010 because the image file has been copied to the storage unit 1008 in step S2003 and needs to be deleted. In contrast, if the user chooses to "re-edit the album that has already been ordered" in step S2001, the process ends immediately.

In step S2010, the image files that are used in the layout list created in step S2006 are left, and the image files that have not been used in the layout list are deleted. The image files used in the layout list may undergo a layout change in step S2007 at the time of re-editing, and the image files to be used after the layout change may be different. Therefore, the image file copied to the storage unit 1008 is left without any change. On the other hand, the image files that have not been used in the layout list are deleted from the storage unit 1008 because when the layout is changed in step S2007 at the time of re-editing, those image files are not used regardless of any layout change.

Note that in step S2010, the present invention is not limited to a case in which all the image files that have not been used in the layout list are deleted. For example, configuration may be such that, out of the image files that have not been used in the layout list, the image file whose evaluation value is equal to or larger than a predetermined value as a result of scoring in step S2005 is not deleted. Alternatively, configuration may be such that, out of the image files that have not been used in the layout list, the predetermined number of image files each having a higher evaluation value is not deleted. Then, in re-editing, a layout list which also includes images that have not been used in the layout list in initial editing and are not deleted from the storage unit 1008 may be created anew.

That is, in step S2010, at least some of the image files that have not been used in the layout list are deleted.

In this embodiment, the image in the SD memory card is loaded first in step S2002, and then the layout process is performed. In this case, if one SD memory card is used, scoring in step S2005 is performed on the image file in that card, creating a layout candidate in step S2006. Then, the image files used in the layout list may be copied to the storage unit 1008 after the album is ordered.

Therefore, according to the above-described embodiment, it is possible to use all the image files saved in the external storage medium while editing the album and to save the capacity of the storage unit because at least some of the image files unused for the album are deleted from the storage unit after the album is ordered. Further, in a case where the album that has been ordered once is to be reordered, the image files used for the album are saved in the storage unit, allowing the reorder directly.

In this embodiment, loading from an external storage medium 1013 like the SD memory card has been described. It is also possible, however, to create an album from the image files that are not in the storage unit 1008. The process described in this embodiment is also applicable to image loading from an external service such as an SNS capable of sharing image files or an external network storage service. This aspect will be described in the embodiment below.

In step S2006 described above, the plurality of layouts are created. However, the present invention is not limited to this. For example, from the image files obtained in step S2003, the first selection of images each serving as a candidate for a layout target may be made, and further from them, the second selection of images of the layout target may be made. Then, a layout image obtained by laying out, in the template, the images of the layout target of which the second selection has been made may be displayed as shown in FIG. 7. Then, according to a user instruction of displaying another layout image, the other layout image may be displayed by using other images of which the first selection has been made.

In this case, in step S2010, the above-described image files of which the first selection has been made remain in the storage unit 1008 without being deleted. Accordingly, the image that has been the candidate for the layout target remains even if it is not laid out in the template in the initial editing. It is therefore possible, in re-editing, to use this image for re-editing without obtaining it a new.

Second Embodiment

In the first embodiment, it is necessary to load the images from the external storage medium and hold the image files that may be used in the storage unit. On the other hand, when a photo file posted onto an SNS site is loaded to create an album, it is possible to perform a process in a shorter time by downloading only images each of which may become a target for re-editing at the time of re-editing rather than downloading all images even if the images are once deleted from a storage unit. In this embodiment, album creation processing by utilizing the SNS site will be described.

Figure 8:
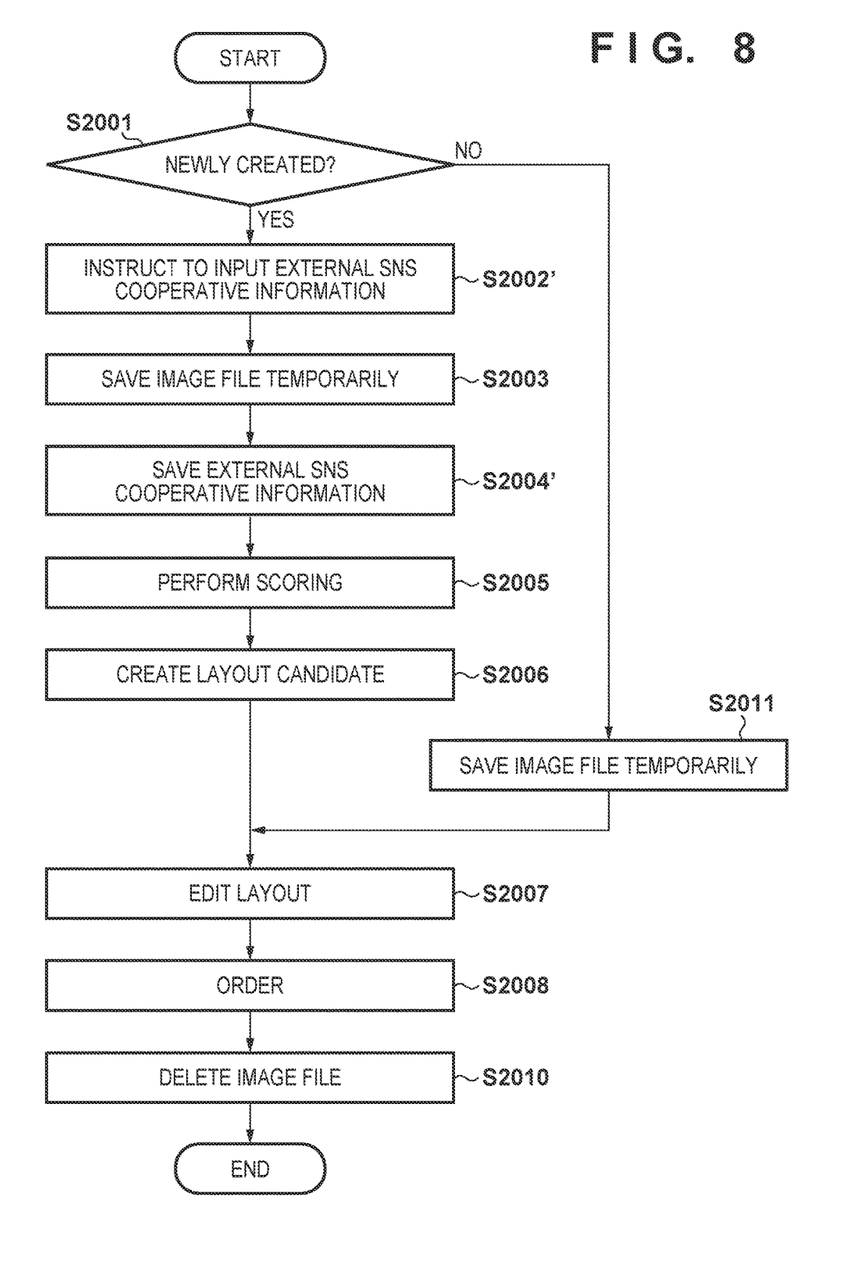
FIG. 8 is a flowchart showing album creation processing according to the second embodiment.

FIG. 8 is a flowchart showing album creation processing performed by a CPU 1011 of an information processing apparatus 1004 according to this embodiment. Note that in FIG. 8, the same processing steps as those described with reference to FIG. 2 are denoted by the same step reference numbers, and a description thereof will be omitted.

In step S2001, if it is judged that an album is newly created, the process advances to step S2002' to prompt a login to the SNS site.

Figure 9:
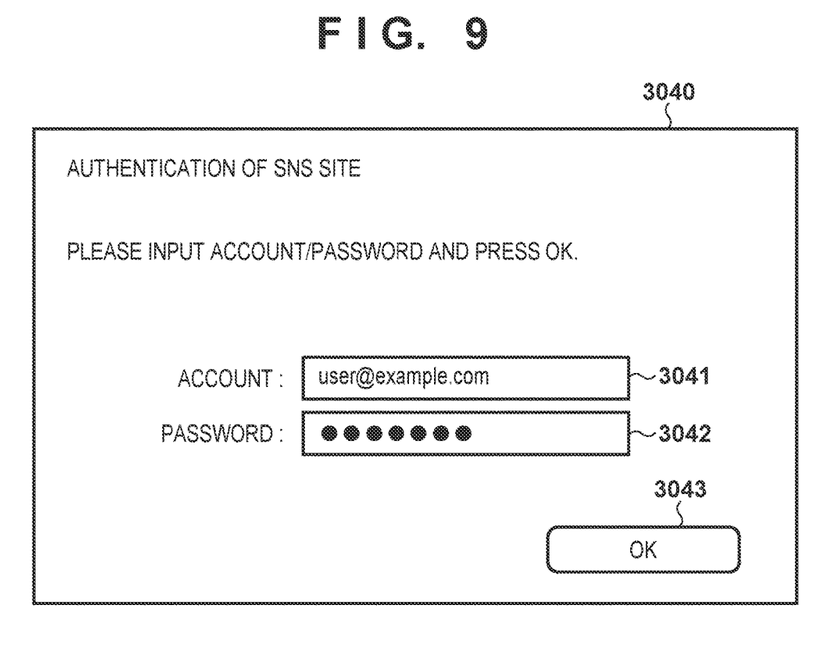
FIG. 9 is a view showing a screen of a user interface which prompts authentication of an external SNS site in album creation processing or image edit processing.

FIG. 9 is a view showing a screen of a user interface (UI) used when prompting a user to log in to the SNS site. In step S2002', a screen 3040 which contains a message for prompting the login to the SNS site as shown in FIG. 9 is displayed to input user account information needed to download image files posted onto the SNS site. Prompted by this message, the user inputs his/her own account and password, respectively, to input fields 3041 and 3042, and clicks an OK button 3043.

Then, in step S2003, the image files are copied to a storage unit 1008. In this embodiment, however, the image files posted onto the SNS site are downloaded by using the input user account information. In general, when accessing the SNS site by using the user account information, the user can obtain a URL needed for download for each posted image file. Then, the user downloads the image file of interest by accessing this URL.

Then, in step S2004', the information processing apparatus 1004 holds the user account information input in step S2002'. Then, as in the first embodiment, the process in steps S2005 to S2008 is performed.

The image files are deleted in step S2010. In this embodiment, however, the download URLs of the image files used in a layout list created in step S2006 are held, and all the image files are deleted.

The image files used in the layout list may undergo a layout change in step S2007 at the time of re-editing, and the image files to be used after the layout change may be different. Therefore, the URL needed for download is left in the storage unit 1008. On the other hand, when the image files unused in the layout list undergo the layout change in step S2007 at the time of re-editing, those image files are not used regardless of any layout change. Therefore, they are deleted from the storage unit 1008 together with their URLs needed for download. Note that as in step S2010 of FIG. 2, configuration may be such that the URL of the image file whose evaluation value is equal to or higher than a threshold or relatively larger than that of another image file is not deleted, without being limited to a case in which the URLs of all the image files that have not been used in the layout list are deleted.

If the user chooses to "re-edit the album that has already been ordered" in step S2001, the process advances to step S2011, and the image files with the saved URLs are downloaded. When the image files are deleted in step S2010 as described above, the URLs needed for download are saved for some of the image files. Therefore, in step S2011, the URLs saved in step S2010 are used to download the image files again.

Note that step S2003 and step S2011 are different from each other. While all the image files owned by the user are downloaded by using the URLs in step S2003, only the image files used for re-editing are downloaded in step S2011. This makes it possible to reduce a time needed for download and resume editing immediately.

Therefore, according to the above-described embodiment, it is possible to edit an album by using the image files that can be downloaded from the SNS site while editing the album, and only the URLs of the image files needed to re-edit the album are held after the album is ordered. This makes it possible to save the capacity of the storage unit because it is only necessary to download the image files by using the held URLs at the time of re-editing. When the album that has been ordered once is to be reordered, it is also possible to reduce a download time needed for re-edit processing because it is only necessary to download the image files used for the album.

Note that both in the first embodiment and the second embodiment, when the layout list is created, a layout list compatible with the large size of an album is preferably created and saved in addition to the size of the album to be created. This also makes it possible to order an album of a small size for a try, and then to renew an order for an album of a large size if the album of the small size is good.

Further, both in the first embodiment and the second embodiment, in the edit processing in step S2007, there may be a case in which a user wishes some image files in the layout to be replaced by image files that match a user preference in addition to edit processing of choosing a layout that matches the user preference. In this case, a user operation takes time if all the image files obtained by copying (or downloading) the image files that match the user preference in step S2003 are displayed on a monitor 1006 to be chosen. It is therefore more user-friendly that as a result of scoring in step S2005, the image files high in scoring result are displayed with careful selection to be chosen by the user. Hence, when choice processing as described above is performed in the layout edit processing in step S2007, image files (the URLs of images) as follows can also be left in addition to the image files (the URLs of the images) used in the layout list. That is, the image files (the URLs of the images) high in the scoring result in step S2005 and to be chosen by the user in step S2007 are left.

Note that in a scoring process in step S2005 of FIGS. 2 and 8, personal recognition is executed. Accordingly, when an album is created by using a layout list centered on a specific person in personal recognition, a user may wish a layout list centered on another person to be used in re-editing after an order. In this case as well, it is also possible to leave not image files (the URLs of images) used from all layout lists but the image files (the URLs of images) used in a layout list other than a layout list centered on a utilized person.

In any case, in the first and second embodiments, the image files are downloaded by loading the image files from the SD memory card or obtaining the URLs needed to download the image files from the SNS in step S2003. Then, the image files used by the user in the edit processing are selected by scoring in step S2005 and the layout list created in step S2006. Therefore, as long as only the selected image files or only the URLs of the selected image files are left, it has no influence on re-editing after an order, and it has an advantage of downloading only images needed at the time of re-editing after the order.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A plurality of apparatuses may implement processing in the above-described embodiment in cooperation with each other without being limited to a case in which one apparatus performs the processing in the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-255234, filed Dec. 25, 2015, which is hereby incorporated by reference herein in its entirety.

What is claimed is:

1. An information processing apparatus which lays out a plurality of images, the apparatus comprising:
   a storage which stores images; and
   a processor configured to:
      receive a first instruction for creating a new album or a second instruction for re-editing images laid out on an existing album which has been created and ordered;
      make a first selection of first images out of the images stored in the storage in a case where the first instruction is received;
      make a second selection of second images out of the selected first images which are selected in the first selection;
      lay out at least some of the selected second images which are selected in the second selection, on the new album;
      delete, from candidates for re-editing the laid out images on the new album which has been ordered, at least some of the images that have not been selected in the first selection such that at least some of the first images that have been selected in the first selection and have not been selected in the second selection remain as the candidates in addition to the selected second images; and
      re-edit the laid out images on the new album which has been ordered, by using the candidates from which the at least some of the images have been deleted in a case where the second instruction is received
   wherein even if the images laid out on the new album which has been ordered are re-edited and the new album is re-ordered, deletion from the candidates for re-editing the laid out images on the new album is not executed.

2. The apparatus according to claim 1, wherein the processor is further configured to obtain images stored in an external storage medium different from the storage, and the storage stores the obtained images.

3. The apparatus according to claim 2, wherein the external storage medium includes a memory card that can be inserted into and removed from the information processing apparatus.

4. The apparatus according to claim 1, wherein the processor is further configured to lay out, according to a user instruction, the images which have been selected in the first selection and have not been selected in the second selection.

5. The apparatus according to claim 1, wherein the processor is further configured to leave, as the candidates, an image high in a scoring result used to create the layout out of the first images that have been selected in the first selection and have not been selected in the second selection in addition to the selected second images.

6. The apparatus according to claim 1, wherein the processor is further configured to output, to a printer, image data of an album created by the layout by the processor as print data.

7. The apparatus according to claim 6, wherein the printer comprises a printer connected to the information processing apparatus or a printer connected via a network.

8. The apparatus according to claim 1, wherein the processor is further configured to determine, after an album is ordered or re-ordered, whether the ordered or re-ordered album is newly created, and
   the deletion is executed in a case where it is determined that the ordered album is newly created.

9. A non-transitory computer readable storage medium which stores a computer program to be executed in a processor of an information processing apparatus which lays out a plurality of images, the program comprising:
   storing images in a storage;
   receiving a first instruction for creating a new album or a second instruction for re-editing images laid out on an existing album which has been created and ordered;
   making a first selection of first images out of the images stored in the storage in a case where the first instruction is received;
   making a second selection of second images out of the selected first images which are selected in the first selection;
   laying out at least some of the selected second images which are selected in the second selection, on the new album;
   deleting, from candidates for re-editing the laid out images on the new album which has been ordered, at least some of the images that have not been selected in the first selection such that at least some of the first images that have been selected in the first selection and have not been selected in the second selection remain as the candidates in addition to the selected second images; and
   re-editing the laid out images on the new album which has been ordered, by using the candidates from which the at least some of the images have been deleted in a case where the second instruction is received,
   wherein even if the images laid out on the new album which has been ordered are re-edited and the new album is re-ordered, deletion from the candidates for re-editing the laid out images on the new album is not executed.

10. An information processing method of laying out a plurality of images, the method comprising:
    storing images in a storage;
    receiving a first instruction for creating a new album or a second instruction for re-editing images laid out on an existing album which has been created and ordered;
    making a first selection of first images out of the images stored in the storage in a case where the first instruction is received;
    making a second selection of second images out of the selected first images which are selected in the first selection;
    laying out at least some of the selected second images which are selected in the second selection, on the new album;
    deleting, from candidates for re-editing the laid out images on the new album which has been ordered, at least some of the images that have not been selected in the first selection such that at least some of the first images that have been selected in the first selection and have not been selected in the second selection remain as the candidates in addition to the selected second images; and re-editing the laid out images on the new album which has been ordered, by using the candidates from which the at least some of the images have been deleted in a case where the second instruction is received, wherein even if the images laid out on the new album which has been ordered are re-edited and the new album is re-ordered, deletion from the candidates for re-editing the laid out images on the new album is not executed.

11. The method according to claim 10, further comprising:

obtaining images stored in an external storage medium different from the storage; and storing the obtained image in the storage.

12. The method according to claim 10, wherein in the laying out, the images which have been selected in the first selection and have not been selected in the second selection are laid out according to a user instruction.

13. The method according to claim 10, wherein in the deleting, an image high in a scoring result used to create the layout out of the first images that have been selected in the first selection and have not been selected in the second selection is left as the candidates in addition to the selected second images.

14. The method according to claim 10, further comprising determining, after an album is ordered or re-ordered, whether the ordered or re-ordered album is newly created, and the deletion is executed in a case where it is determined that the ordered album is newly created.

* * * * *